June 8, 1937. R. E. PENNELL 2,082,809
PRODUCTION OF POTASSIUM SULPHATE FERTILIZER MATERIAL
Filed June 18, 1936
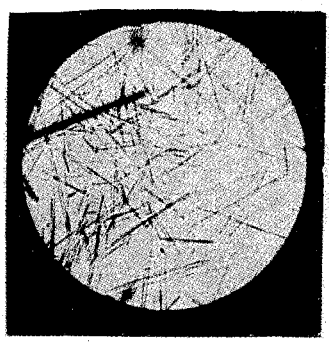
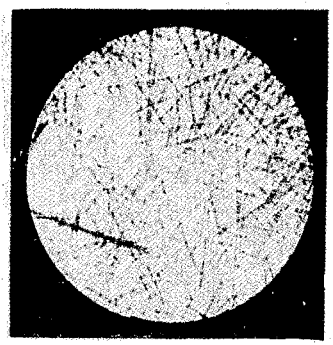
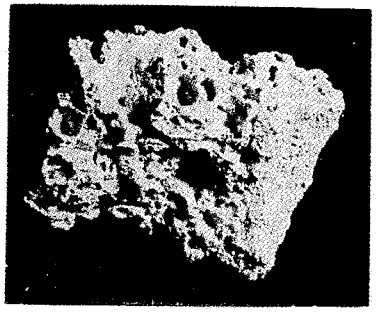
INVENTOR:
Robert E Pennell Patented June 8, 1937

2,082,809

UNITED STATES PATENT OFFICE 2,082,809

PRODUCTION OF POTASSIUM SULPHATE FERTILIZER MATERIAL

Robert E. Pennell, Anderson, S. C.

Application June 18, 1936, Serial No. 86,013

3 Claims. (Cl. 23—117)

The present invention has for its object the production of fertilizer material containing sulphate of potash as an important constituent.

Up to the present time, essentially all sulphate potash and sulphate potash magnesia used for fertilizer purposes are imported into the United States although this country has a surplus of sulphuric acid and abundance of dolomitic limestone analyzing as high as 46% magnesium carbonate and 52% calcium carbonate, as well as a good production of potassium chloride analyzing as high as 62.5% $K_2O$. Except for the potash, these materials are in the center of the tobacco and truck areas requiring fertilizers containing water soluble magnesium and potash which is chlorine free. The present cost per unit $K_2O$ in KCl is 50¢, while the cost is 96¢ per unit in sulphate potash magnesia (imported). It is impossible to manufacture sulphate of potash directly as such economically in this country, although it is possible to manufacture sulphate potash-water soluble magnesia fertilizer material to a great advantage and profit as described in my process. This process has for its object the production of a fertilizer material containing potash practically free of chlorine in combination with water soluble magnesia with calcium present largely as gypsum as a conditioner. In this process the magnesium is changed from the carbonate to the more valuable water soluble sulphate form, thus giving a very desirable fertilizer material.

In accordance with the present invention, I first treat potassium chloride with sulphuric acid, but not in such proportions as to form the neutral-potassium sulphate. On the other hand, I preferably employ such proportions as to give potassium bisulphate, or at least a mixture approximating such composition. This potassium bisulphate is subsequently acted upon with other materials as given below, to produce final fertilizers or final materials to which additional fertilizing agents can be added or not as desired.

The following is given as the preferred mode of treating the original potassium chloride used, to give a product consisting largely or substantially of potassium hydrogen sulphate.

The sulphuric acid can be put into a reaction kettle having a gas outlet, and having a rather wide outlet opening at the bottom for reaction products which consist largely of potassium bisulphate. The step here referred to was, in a particular run, carried out in the following manner. Sulphuric acid, at room temperature, say 17.2 parts of 61° Bé. acid, were placed in a closed kettle having a gas exit leading to a suitable absorbing device, such as a tower having a filling therein. Crude potassium chloride, (e. g. potassium chloride of fertilizer grade) is slowly added to the sulphuric acid, until about 10 parts have been added. During the said addition which required about 2 hours, the mixture of said acid with chloride is continuously agitated.

The kettle and its contents are then heated slowly, while continuing the agitation, until the material in the kettle reached a temperature of 300° F. This heating was continued for about 3 hours.

During these operations, nearly all of the hydrochloric acid is removed leaving potassium hydrogen sulphate in a more or less fused condition. The mass was slowly heated in the kettle, and the hydrochloric acid vapors given off were led to a scrubber of a suitable sort for absorption of the gases. About 95% of the KCl was converted into $KHSO_4$ during this treatment.

I do not restrict myself to the details of this illustration. In other runs of the process, temperatures between 240 and 400° F. were used.

The potassium hydrogen sulphate, at 300° F., was a semi-liquid mass.

Example

The potassium acid sulphate can be treated with dolomitic lime-stone, forming neutral potassium sulphate, magnesium sulphate and calcium sulphate, carbon dioxide being given off.

Preferably about 3 parts of the hot potassium bisulphate, for example as coming from the kettle above referred to, is intimately mixed with 1 part of dolomitic lime-stone. The $KHSO_4$ reacts with the magnesium carbonate and with the calcium carbonate, to form sulphate. The treatment is best carried out by introducing the dolomitic lime-stone in powdered form into a mixer, and adding the hot potassium bisulphate in a semi-liquid condition, at a temperature of say 300° F. The materials are well mixed in a mixer, illustratively of the type commonly used for mixing cement. The material is then placed in storage and the reaction continues to go on for say a week or two. Volumes of carbon dioxide are liberated, and during the process of reacting the carbon dioxide liberated gives the material a more or less porous condition.

It will be understood that exhaust openings are provided to remove the gases formed during the reaction, both in the mixing device and the storage space.

As an example of above specific case:

When 2½ grams of the resulting salt are dissolved in 150 cc. of cold water with stirring and then washed on filter up to 25° cc., 97% of this material is found to be water soluble,
The analysis being as follows:

|  | Percent |
|---|---|
| 1. Moisture at 105° C | 1.80 |
| 2. Residue (insoluble in cold water) (Consisting principally of $SiO_2$ and insoluble with traces of dolomite and gypsum.) | 2.96 |
| Water solution 97.04% of total: | |
| 3. $K_2SO_4$ | 44.40 |
| 4. $MgSO_4$ | 15.48 |
| 5. $CaSO_4$ | 17.24 |
| 6. Combined water | 6.10 |
| 7. Ferrous sulphate $FeSO_4$ (Equivalent of $R_2O_3$.) | 7.60 |
| 8. Combined water | 5.40 |
| 9. KCl | 1.88 |

$SO_3$ found 43.22%.

You will note from above analysis that 3, 4, 5 and 6 correspond very closely to that of $$2K_2SO_4.MgSO_4.CaSO_4.2H_2O$$

showing however a purity of approximately 82%. The above C. P. tri-salt should contain 54.36% $K_2SO_4$, 18.79% $MgSO_4$, 21.23% $CaSO_4$ and 5.62% $H_2O$. The ferrous sulphate shown in the above sample is high due to the fact that the $KHSO_4$ was made in a wrought iron reaction kettle. This would probably be much lower in a cast or duriron kettle.

The reaction taking place in mixing the $KHSO_4$ and in forming the complex sulphate salt is as follows:

$$4KHSO_4 + MgCO_3 + CaCO_3 =$$
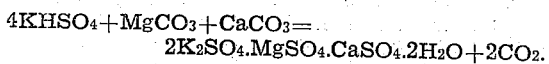
$$2K_2SO_4.MgSO_4.CaSO_4.2H_2O + 2CO_2.$$

In this reaction the magnesium and calcium in the dolomite, $Mg, Ca (CO_3)_2$, is changed from the water insoluble condition to the more valuable water soluble form in the $$2K_2SO_4.MgSO_4.CaSO_4.2H_2O$$

In making the $KHSO_4$ in the above case the KCl used analyzed 62.71% $K_2O$. The dolomite subsequently mixed with the $KHSO_4$ analyzed 45–46% magnesium carbonate and 50–52% calcium carbonate, and was finely ground all passing through 150 mesh screen.

A saturated solution of this salt was found to contain 4.65 grams per 100 cc. of water at a temperature of 60–65° F. A saturated solution in boiling water was found to be 8.20 grams per 100 cc. Considering this, it would seem that its use in the soil should result in reduced leaching, more even plant feeding, and also reduce the tying up of its potash as an insoluble silicate.

It is seen from above that the calcium sulphate in solution is far greater in this combination than would be found in a saturated solution of gypsum at these temperatures.

A portion of above salt was purified by taking up 15 grams in 100 cc. of boiling water, neutralized with ammonia, a few drops of $H_2O_2$ added, boiled, Fe and undissolved matter filtered out. The filtrate was evaporated with distilled water to near dryness three times and excess water poured from crystals each time which were then placed on filter to drain. The freshly prepared crystals were then micro-photographed as shown on drawing accompanying present application. See Fig. 1 and Fig. 2.

It will be noted that these crystals shown under microscope are of uniform structure and needlelike or fibrous in character showing a combination of potassium, magnesium, and calcium sulphates. On the drawing is also shown a lump of the crude material $$2K_2SO_4.MgSO_4.CaSO_4.2H_2O$$

as produced, showing honey-comb effect of its set-up. See Fig. 3.

In another case 2 grams of the sample were dissolved in 100 cc. of cold water by stirring. The 2.96% water insoluble matter was then removed by filtration. The entire filtrate containing 97.04% was evaporated practically to dryness, leaving the crystals slightly moist. The different portions of these crystals were then examined under microscope and found to be practically identical with crystals photographed above.

I claim:—

1. A process of producing a dry free-flowing fertilizer salt which comprises reacting upon a material consisting predominantly of potassium bisulphate, in a hot dry condition, with dolomite, in such proportions as to substantially entirely react with the bisulphate, thereby converting the potash into a neutral salt in combination with magnesium and calcium as sulphates.

2. A process of producing a dry free-flowing fertilizer salt which comprises reacting upon potassium chloride with sulphuric acid in such proportions as to drive off most of the chlorine content of such chloride in the form of hydrochloric acid and leaving a material consisting principally of potassium bisulphate, and then reacting upon said potassium bisulphate, in a hot dry condition, with dolomite, in such proportions as to substantially entirely react with the bisulphate, thereby converting the potash into a neutral salt in combination with magnesium and calcium as sulphates.

3. A new fertilizer material, as produced in claim 1, comprising a triple salt of potassium, magnesium, calcium, sulphates coresponding substantially to the formula $$2K_2SO_4.MgSO_4.CaSO_4.2H_2O.$$

ROBERT E. PENNELL.